(12) United States Patent
Kanada et al.

(10) Patent No.: US 10,410,777 B2
(45) Date of Patent: *Sep. 10, 2019

(54) R-T-B BASED SINTERED MAGNET AND MOTOR

(71) Applicant: TDK Corporation, Tokyo (JP)

(72) Inventors: Isao Kanada, Tokyo (JP); Masashi Miwa, Tokyo (JP); Haruna Nakajima, Tokyo (JP); Eiji Kato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 478 days.

This patent is subject to a terminal disclaimer.

(21) Appl. No.: 14/906,732

(22) PCT Filed: Aug. 8, 2014

(86) PCT No.: PCT/JP2014/070969
§ 371 (c)(1),
(2) Date: Jan. 21, 2016

(87) PCT Pub. No.: WO2015/020181
PCT Pub. Date: Feb. 12, 2015

(65) Prior Publication Data
US 2016/0163434 A1 Jun. 9, 2016

(30) Foreign Application Priority Data

Aug. 9, 2013 (JP) .................. 2013-166355

(51) Int. Cl.
| | |
|---|---|
| *H01F 1/059* | (2006.01) |
| *B22F 1/00* | (2006.01) |
| *C22C 38/00* | (2006.01) |
| *H01F 1/057* | (2006.01) |
| *C22C 38/02* | (2006.01) |
| *C22C 38/06* | (2006.01) |
| *C22C 38/10* | (2006.01) |
| *C22C 38/16* | (2006.01) |

(Continued)

(52) U.S. Cl.
CPC ............ *H01F 1/059* (2013.01); *B22F 1/0003* (2013.01); *C22C 38/00* (2013.01); *C22C 38/002* (2013.01);
(Continued)

(58) Field of Classification Search
None
See application file for complete search history.

(56) References Cited

U.S. PATENT DOCUMENTS

| | | | |
|---|---|---|---|
| 2011/0279205 A1* | 11/2011 | Fukui | .................... C22C 38/002 335/302 |
| 2013/0092868 A1* | 4/2013 | Nakajima | ............. C22C 38/005 252/62.51 R |

(Continued)

FOREIGN PATENT DOCUMENTS

| | | |
|---|---|---|
| JP | H04-6806 A | 1/1992 |
| JP | H04-330702 A | 11/1992 |

(Continued)

OTHER PUBLICATIONS

132 Affidavit for case U.S. Appl. No. 14/378,432. Sep. 2015.*
(Continued)

*Primary Examiner* — Xiaowei Su
(74) *Attorney, Agent, or Firm* — Oliff PLC

(57) ABSTRACT

An R-T-B based sintered magnet has excellent corrosion resistance together with good magnetic properties. The R-T-B based sintered magnet contains $R_2T_{14}B$ grains, wherein, an R—Cu-M-C concentrated part is existed in a grain boundary formed between or among two or more adjacent $R_2T_{14}B$ grains, and the concentrations of R (R is at least one from Sc, Y and the lanthanoide element), Cu, M (M is at least one from Ga, Si, Sn, Ge and Bi) and C in the R—Cu-M-C concentrated part are higher than those in the $R_2T_{14}B$ grains respectively.

13 Claims, 6 Drawing Sheets

(51) Int. Cl.
    *H02K 1/02*      (2006.01)
    *H02K 1/27*      (2006.01)
    *H01F 41/02*     (2006.01)

(52) U.S. Cl.
    CPC .......... *C22C 38/005* (2013.01); *C22C 38/008* (2013.01); *C22C 38/02* (2013.01); *C22C 38/06* (2013.01); *C22C 38/10* (2013.01); *C22C 38/16* (2013.01); *H01F 1/0577* (2013.01); *H02K 1/02* (2013.01); *H02K 1/2706* (2013.01); *B22F 2301/35* (2013.01); *B22F 2998/10* (2013.01); *B22F 2999/00* (2013.01); *H01F 41/0293* (2013.01)

(56) References Cited

U.S. PATENT DOCUMENTS

2015/0155083 A1    6/2015  Miwa et al.
2016/0042848 A1*   2/2016  Kuniyoshi ............ C22C 38/002
                                                        75/246
2016/0180993 A1*   6/2016  Kanada .................. C22C 38/00
                                                        252/62.55
2016/0225502 A1*   8/2016  Miwa .................... H01F 1/0577

FOREIGN PATENT DOCUMENTS

JP    2011-258935 A    12/2011
JP    2013-098447 A     5/2013
WO    2013/122256 A1    8/2013

OTHER PUBLICATIONS

Katter et al. (IEEE Transactions on Magnetics, 2001, vol. 37, p. 2474-2476) (Year: 2001).*
Nov. 18, 2014 International Search Report issued in International Patent Application No. PCT/JP2014/070969.
Nov. 18, 2014 Written Opinion issued in International Patent Application No. PCT/JP2014/070969.

* cited by examiner

R-T-B BASED SINTERED MAGNET AND MOTOR

The present invention relates to an R-T-B based sintered magnet having one or more rare earth element(s) (R), at least one transition metal element (T) with Fe or the combination of Fe and Co as the necessity, and Boron (B) as the main components. The present invention also relates to a motor provided with the R-T-B based sintered magnet.

BACKGROUND

In spite of excellent magnetic properties, an R-T-B based sintered magnet tends to have a bad corrosion resistance because of the inclusion of the rare earth element as the main component which is easily oxidized.

In the conventionally used R-T-B based sintered magnet, hydrogen will be produced as water such as water vapor in the environment oxidizes R in the R-T-B based sintered magnet, and said hydrogen is stored in the R-rich phase in the grain boundary. In this respect, corrosion occurs in the R-rich phase so that the magnetic properties of the R-T-B based sintered magnet deteriorate.

Therefore, in order to improve the corrosion resistance of the R-T-B based sintered magnet, the surface of the magnet body is generally treated by, for example, resin coating, plating or the like. On the other hand, the additive element or the internal structure of the magnet body can be changed to improve the corrosion resistance of the magnet body itself. The improvement of the corrosion resistance in the magnet body itself is extremely important to heighten the reliability of a product that has been subjected to a surface treatment. Besides, said improvement may thereby allow a surface treatment simpler than the resin coating or plating, which is advantageous for reducing the cost of the product.

Conventionally, for instance, patent document 1 has suggested a technique to improve the corrosion resistance of a magnet by reducing the carbon content in a permanent magnet alloy to 0.04 mass % or less and inhibiting the formation of the intermetallics R—C of the rare earth element and carbon in a non-magnetic R-rich phase to 1.0 mass % or less. In addition, patent document 2 has proposed a technique to improve the corrosion resistance by setting the concentration of Co in an R-rich phase at 5 mass % to 12 mass %.

However, as suggested in patent document 1, in order to reduce the carbon content in the magnet alloy to 0.04 mass % or less, it is necessary to greatly reduce the amount of the lubricant added to improve the magnetic field orientation when the magnet is pressed in a magnetic field. Therefore, the orientation degree of the magnetic powders in a green compact decreases and the residual magnetic flux density Br after sintering also decreases so that it is not possible to obtain a magnet having sufficient magnetic properties.

On the other hand, as suggested in patent document 2, it is necessary to increase the content of Co in the raw material so as to increase the Co concentration in an R-rich phase. However, since Co also enters the main phase of $R_2T_{14}B$ phase to substitute Fe, it cannot be achieved to increase the Co concentration only in the R-rich phase. More Co should be added than that as needed in the R-rich phase. Therefore, production cost rises as the amount of the expensive Co in use increases, and magnetic properties deteriorate as Fe in the main phase is substituted with Co at a level more than that as needed.

PATENT DOCUMENTS

Patent document 1: JP-A-H4-330702
Patent document 2: JP-A-H4-6806

SUMMARY

In view of the conditions mentioned above, the present invention aims to provide an R-T-B based sintered magnet having an excellent corrosion resistance and good magnetic properties. The present invention also aims to provide a motor having this R-T-B based sintered magnet.

In order to achieve the object, the present inventors have extensively studied the mechanism about the corrosion of the R-T-B based sintered magnet. It can be known from the results that hydrogen produced in the corrosion reaction of water such as the water vapor in the environment with R in the R-T-B based sintered magnet is stored into the R-rich phase existing in the grain boundary of the R-T-B based sintered magnet, resulting in the development of the corrosion in the R-T-B based sintered magnet.

If the details are described here, the corrosion of the R-T-B based sintered magnet progresses with the following processes. First of all, as the R-rich phase existing in the grain boundary may be easily oxidized, R of the R-rich phase existing in the grain boundary is oxidized by the water from such as the water vapor in the environment and thus R is eroded and changed into hydroxides. During this process, hydrogen is produced.

$$2R + 6H_2O \rightarrow 2R(OH)_3 + 3H_2 \quad (I)$$

Next, the produced hydrogen is stored into the uncorroded R-rich phase.

$$2R + xH_2 \rightarrow 2RH_x \quad (II)$$

Then, the R-rich phase will be easily corroded due to the hydrogen storage, and hydrogen is produced in an amount more than that stored in the R-rich phase due to the corrosion reaction of the R-rich phase having hydrogen stored with water.

$$2RH_x + 6H_2O \rightarrow 2R(OH)_3 + (3+x)H_2 \quad (III)$$

Corrosion of the R-T-B based sintered magnet progresses towards the interior of the R-T-B based sintered magnet due to the above chain reactions (I) to (III), and the R-rich phase turns into an R hydroxide and an R hydride. Stress is accumulated by a volume expansion associated with this change, resulting in the falling off of the $R_2T_{14}B$ grain (the main phase grain) constituting the main phase of the R-T-B based sintered magnet. Then, a new surface of the R-T-B based sintered magnet emerges due to the falling off of the grains of the main phase. The new surface will react with the water vapor in the environment or the like again, undergoing the chain reactions (I) to (III) mentioned above. Then, another new surface will emerge once again. Through such a cycle, the corrosion of the R-T-B based sintered magnet further progresses into the interior of the R-T-B based sintered magnet.

Therefore, the present inventors have pursued extensive studies on the method for preventing the corrosion in the grain boundary from developing. As a result, they found that the hydrogen can be prevented from being stored in the grain boundary by forming an R—Cu-M-C concentrated part in the grain boundary formed between or among two or more adjacent $R_2T_{14}B$ grains (particularly a triple junction formed among three or more adjacent $R_2T_{14}B$ grains) in the R-T-B based sintered magnet, wherein the concentrations of R (R represents at least one rare earth element), Cu, M (M represents at least one selected from the group consisting of Ga, Si, Sn, Ge and Bi) and C in the R—Cu-M-C concentrated part are all higher than those in the $R_2T_{14}B$ grains respectively. Further, the corrosion resistance of the R-T-B based sintered magnet can be improved to a large extent and good magnetic properties can be provided. The present invention has been made based on the above findings.

The R-T-B based sintered magnet according to the present invention is characterized in that it contains $R_2T_{14}B$ grains, wherein, an R—Cu-M-C concentrated part exists in a grain boundary formed between or among two or more adjacent $R_2T_{14}B$ grains, and the concentrations of R (R represents at least one rare earth element), Cu, M (M represents at least one selected from the group consisting of Ga, Si, Sn, Ge and Bi) and C in the R—Cu-M-C concentrated part are all higher than those in the $R_2T_{14}B$ grains respectively.

In a cross-section of the R-T-B based sintered magnet, the area occupied by the R—Cu-M-C concentrated part is 1% or more in the grain boundary.

Further, in the R—Cu-M-C concentrated part, the ratio of the sum of Cu atoms and M atoms to all of R atoms ((Cu+M)/R) is preferably 0.2 or more and 0.6 or less.

In the present invention, with the R—Cu-M-C concentrated part existing in the grain boundary, the hydrogen generated in the corrosion reaction can be effectively prevented from being stored in the R-rich phase existed in the grain boundary and the corrosion resistance of the R-T-B based sintered magnet can be largely improved. Further, the formation of the R—Cu-M-C concentrated part barely affects the magnetic properties so that good magnetic properties can be maintained. In addition, the R-rich phase is defined as a grain boundary phase where R is more than that in $R_2T_{14}B$ grains in content but at least C from the group consisting of Cu, M and C is equal to or less than that in $R_2T_{14}B$ grains.

The present invention also provides a motor provided with the R-T-B based sintered magnet of the present invention. Since the motor of the present invention contains the R-T-B based sintered magnet mentioned above, it will possess excellent performance in a long term even used in a severe condition with a high humidity or the like because little corrosion was caused by the rust or the like in the R-T-B based sintered magnet.

According to the present invention, an R-T-B based sintered magnet having excellent corrosion resistance and good magnetic properties can be provided. In addition, according to the present invention, a motor can be provided. With the R-T-B based sintered magnet, the motor keeps excellent performance in a long term even in an environment with a high temperature and a high humidity.

DETAILED DESCRIPTION OF EMBODIMENTS

Hereinafter, the embodiment of the R-T-B based sintered magnet in the present invention will be described.

<R-T-B Based Sintered Magnet>

Figure 1:
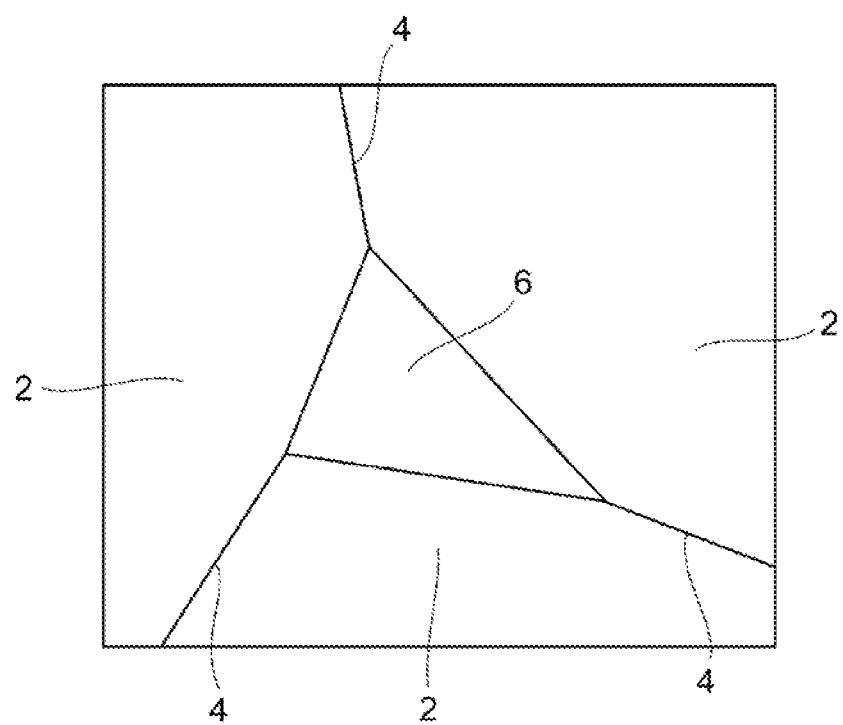
FIG. 1 is a schematic view showing the vicinity of a grain boundary formed between or among a plurality of $R_2T_{14}B$ grains in the R-T-B based sintered magnet of the present invention.

The R-T-B based sintered magnet of the present embodiment is a sintered body formed by an R-T-B based alloy (R represents at least one rare earth element, T represents one or more transition metal elements containing Fe or the combination of Fe and Co, and B represents B or the combination of B and C). As shown in FIG. 1, the R-T-B based sintered magnet of the present embodiment contains the grains (the main phase) 2 composed of $R_2T_{14}B$ grains, wherein an R—Cu-M-C concentrated part exists in a grain boundary formed between or among two or more adjacent grains 2 with the concentrations of R, Cu, M and C in the R—Cu-M-C concentrated part being higher than those in the $R_2T_{14}B$ grains respectively. The grain boundary includes a two-grain boundary 4 formed between two adjacent $R_2T_{14}B$ grains and a triple junction 6 (a multiple-grain boundary) formed among three or more adjacent $R_2T_{14}B$ grains.

A grain (the main phase) composed of the $R_2T_{14}B$ grains mentioned above has a crystal structure composed of $R_2T_{14}B$ type tetragonal crystal system. On the other hands, the average grain size of the $R_2T_{14}B$ grain is generally 1 μm to 30 μm.

The grain boundary contains an R—Cu-M-C concentrated part where the concentrations of R (R represents at least one rare earth element), Cu, M (M represents at least one selected from the group consisting of Ga, Si, Sn, Ge and Bi) and C are higher than that in the $R_2T_{14}B$ grains respectively, or an R-rich phase where more amount of R is contained than that in the $R_2T_{14}B$ grains. Also, other phases such as a B-rich phase with a higher ratio of boron (B) can be contained. The R—Cu-M-C concentrated part may also contain other components as long as it contains R, Cu, M and C as the main components.

The R in the R-T-B based sintered magnet of the present embodiment represents at least one rare earth element. The rare earth element refers to Sc, Y and lanthanoid elements, which belong to the third group of a long period type periodic table. The lanthanoid element includes La, Ce, Pr, Nd, Sm, Eu, Gd, Tb, Dy, Ho, Er, Tm, Yb, Lu. The rare earth element is classified as the light rare earth and the heavy rare earth. The heavy rare earth element (hereinafter also referred to as RH) includes Gd, Tb, Dy, Ho, Er, Tm, Yb and Lu while the light rare earth element (hereinafter referred to as RL) includes the other rare earth elements. According to the present embodiment, R is preferable to include RL (the rare earth element including at least either or both of Nd and Pr) in view of production cost and magnetic properties. Further, R may also include both RL (the rare earth element including at least either or both of Nd and Pr) and RH (the rare earth element including at least either or both of Dy and Tb) in view of improving the magnetic properties.

The T in the R-T-B based sintered magnet of the present embodiment represents one or more transition metal elements containing Fe or the combination of Fe and Co. T may be Fe alone or Fe partly substituted by Co. As an transition element other than Fe and Co, elements such as Ti, V, Cu, Cr, Mn, Ni, Zr, Nb, Mo, Hf, Ta, W and the like can be listed here. Further, in addition to the transition metal element, T may further include at least one element from the group consisting of, for example, Al, Ga, Si, Bi and Sn or the like.

The B in the R-T-B based sintered magnet of the present embodiment represents boron or alternatively B partly substituted with carbon (C). In this case, the preparation of the magnet becomes easy and the preparation cost is likely to decrease. Further, the amount of C used to substitute B is an amount that will produce substantially no effect on the magnetic properties.

In addition, O, Ca and the like may be inevitably mixed therein. They can be contained in an amount of approximately 0.5 mass % or less each.

The content of R in the R-T-B based sintered magnet according to the present embodiment is 25 mass % or more and 35 mass % or less, preferably 29.5 mass % or more and 33 mass % or less, and more preferably 29.5 mass % or more and 32 mass % or less. When the content of R is less than 25 mass %, the generation of $R_2T_{14}B$ compound which is the main phase of the R-T-B based sintered magnet is insufficient. Thus, a-Fe having a soft magnetism may be deposited and the magnetic properties may be deteriorated. On the other hand, if the content of R exceeds 35 mass %, the volume ratio occupied by $R_2T_{14}B$ grains which is the main phase of the R-T-B based sintered magnet will be decreased, and the magnetic properties may deteriorate and the corrosion resistance tends to deteriorate too.

The content of B in the R-T-B based sintered magnet according to the present embodiment is 0.5 mass % or more and 1.5 mass % or less, preferably 0.7 mass % or more and 1.2 mass % or less, and the more preferably 0.75 mass % or more and 0.95 mass % or less. The coercivity HcJ tends to decrease if the content of B is less than 0.5 mass % while the residual magnetic flux density Br tends to decrease when the content of B is more than 1.5 mass %. Particularly, when the content of B ranges from 0.75 mass % to 0.95 mass %, it will be easy to form the R—Cu-M-C concentrated part.

As described above, the T in the R-T-B based sintered magnet of the present embodiment represents one or more transition metal elements containing Fe or the combination of Fe and Co. The content of Fe in the R-T-B based sintered magnet according to the present embodiment is substantially the residual of the constituent elements for the R-T-B based sintered magnet, and Fe may be partly substituted by Co. The content of Co is preferably 0.3 mass % or more and 3.0 mass % or less, and further preferably 1.0 mass % or more and 2.0 mass % or less. If the content of Co exceeds 3.0 mass %, the residual magnetic flux density tends to decrease. Also, the cost on the raw materials tends to be higher. On the other hand, if the content of Co is less than 0.3 mass %, the corrosion resistance tends to deteriorate. In addition, Ti, V, Cr, Mn, Ni, Cu, Zr, Nb, Mo, Hf, Ta, W and the like may be exemplified as the transition metal elements other than Fe or the combination of Fe and Co. Moreover, in addition to the transition metal elements, T may further include at least one element from the group consisting of, for example, Al, Ga, Si, Bi, and Sn.

The R-T-B based sintered magnet of the present embodiment contains Cu, and the content of Cu is preferably 0.01 to 1.5 mass %, more preferably 0.05 to 1.0 mass %, and more preferably 0.05 to 0.55 mass %. With the inclusion of Cu, the coercivity, corrosion resistance and temperature properties of the magnet to be obtained can be improved. In addition, if the content of Cu exceeds 1.5 mass %, the residual magnetic flux density tends to decrease. On the other hand, if the content of Cu is less than 0.01 mass %, it will be hard to form the R—Cu-M-C concentrated part and the corrosion resistance tends to deteriorate. In particular, when Cu is contained within the range of 0.05 mass % to 0.55 mass %, it will be easy to form the R—Cu-M-C concentrated part.

The R-T-B based sintered magnet of the present embodiment contains M (M represents one or more elements selected from the group consisting of Ga, Si, Sn, Ge and Bi). The content of M is preferably 0.01 to 1.5 mass % and more preferably 0.05 to 1.0 mass %. M is preferred to be Ga. With the inclusion of M, the coercivity, corrosion resistance and temperature properties of the magnet to be obtained can be improved. Particularly, when M is used to form the R—Cu-M-C concentrated part, the corrosion resistance can be improved. If the content of M exceeds 1.5 mass %, the residual magnetic flux density tends to decrease. On the other hand, if the content of M is less than 0.01 mass %, it will be hard to form the R—Cu-M-C concentrated part and the corrosion resistance tends to deteriorate.

The R-T-B based sintered magnet of the present embodiment preferably contains Al. With Al, the coercivity, corrosion resistance and temperature properties of the magnet to be obtained can be improved. And the content of Al is preferably 0.03 mass % or more and 0.6 mass % or less, and more preferably 0.05 mass % or more and 0.25 mass % or less.

If needed, Zr may be contained in the R-T-B based sintered magnet of the present embodiment. With Zr, the grain growth can be inhibited during sintering process, and the temperature range for sintering can be enlarged. If Zr is contained, its content is preferably 0.01 mass % or more and 1.5 mass % or less.

A certain amount of oxygen (O) can be contained in the R-T-B based sintered magnet according to the present embodiment. Said certain amount varies depending on other parameters and can be suitably determined. The amount of oxygen is preferably 500 ppm or more from the viewpoint of corrosion resistance. Further, if the magnetic properties are considered, the content is preferably to be 2500 ppm or less and more preferably 2000 ppm or less.

In addition, nitrogen (N) can also be contained in the R-T-B based sintered magnet according to the present embodiment, and the nitrogen content varies depending on other parameters and can be suitably determined. However, if the content is increased, the magnetic properties will deteriorate.

Further, the R-T-B based sintered magnet of the present embodiment contains carbon (C). The content of carbon is 100 to 2000 ppm, more preferably 200 to 1500 ppm, and most preferably 500 to 1500 ppm. The method for adding carbon (C) into the R-T-B based sintered magnet is not particularly restricted. The carbon can be added during the preparation of the sintered body as carbon itself or carbides.

The carbon can also be introduced into the grain boundary from the surface of the sintered body by containing carbon in a diffusion material.

The method for measuring the oxygen content, carbon content and nitrogen content in the R-T-B based sintered magnet may be conventionally well-known ones. For instance, the oxygen content may be measured by an inert gas fusion—non-dispersive infrared absorption method, the carbon content may be measured by a combustion in an oxygen airflow-infrared absorption method, and the nitrogen content may be measured by an inert gas fusion—thermal conductivity method.

As described above, the R-T-B based sintered magnet of the present embodiment has an R—Cu-M-C concentrated part in the grain boundary, wherein the concentrations of R, Cu, M and C are all higher in the R—Cu-M-C concentrated part than those in the $R_2T_{14}B$ grains respectively. As hydrogen is hard to be stored in this concentrated part, the hydrogen produced in the corrosion reaction can be prevented from being stored into the interior R-rich phase and the corrosion can be prevented from developing towards the interior. In addition, compared to the R-rich phase, the R—Cu-M-C concentrated part is more difficult to be oxidized. Thus, the generation of hydrogen in the corrosion can be prevented too. In this respect, the corrosion resistance can be largely improved in the R-T-B based sintered magnet. Also, since the formation of the R—Cu-M-C concentrated part in the grain boundary barely affects the magnetic properties, the magnetic properties of the R-T-B based sintered magnet can be well maintained.

In the present embodiment, in the cross-section of the R-T-B based sintered magnet, the area occupied by the R—Cu-M-C concentrated part in the grain boundary is preferably 1% or more. The method for estimating the area will be described later. If the area of the R—Cu-M-C concentrated part is much too small, the improvement effect on the corrosion resistance tends to decrease.

Further, in the present embodiment, the ratio of the sum of Cu atoms and M atoms to all the R atoms ((Cu+M)/R) is preferably 0.2 or more and 0.6 or less in the R—Cu-M-C concentrated part. Even if an R—Cu-M-C concentrated part is formed with the ratio deviating from the range above, an improvement effect on corrosion resistance will still be provided. However, a specific composition of the R—Cu-M-C concentrated part is thought to exist for improving the corrosion resistance, and the effect will be especially good when the composition falls within the range mentioned above.

The preferable concentration of C is 3 to 30 atomic % and is more preferably 9 to 20 atomic % in the R—Cu-M-C concentrated part.

As described later, in addition to the R-T-B based raw material alloy (a first alloy) mainly forming the main phase, a second alloy mainly forming the grain boundary can be added in the R-T-B based sintered magnet of the present embodiment. And the preparation can be done by controlling the conditions in the preparation process such as the conditions in the heat treatment. The group of elements constituting the R—Cu-M-C concentrated part can be added in any step during the alloy preparation and pulverizations. Also, these elements can be introduced into the grain boundary from the surface of the sintered body by using a grain-boundary-diffusion method.

With respect to the R—Cu-M-C concentrated part formed in the grain boundary of the R-T-B based sintered magnet according to the present embodiment, R, Cu, and M (M represents at least one selected from the group consisting of Ga, Si, Sn, Ge and Bi) and carbon existing in the second alloy forms into compounds in a heat treatment such as a sintering process or an aging treatment, and the compounds are thought to be observed in the grain boundary as the R—Cu-M-C concentrated part. Even if the second alloy contains no Cu, M or carbon, these mentioned elements can be introduced into the grain boundary by a grain-boundary-diffusion method after the sintering process. At that time, to properly perform a diffusion heat treatment of a heat treatment after a diffusion heat treatment is thought to be important to the formation of the R—Cu-M-C concentrated part.

The R-T-B based sintered magnet of the present embodiment usually can be used after being machined into any shape. The shape of the R-T-B based sintered magnet according to the present embodiment is not particularly limited, and it may be a columnar shape such as a cuboid, a hexahedron, a tabular shape, a quadrangular prism and the like. A cross-sectional shape of the R-T-B based sintered magnet may be an arbitrary shape such as C-shaped cylindrical shape. As for a quadrangular prism, the quadrangular prism can be one with its bottom surface being a rectangle or one with the bottom surface being a square.

The R-T-B based sintered magnet according to the present embodiment includes both a magnet product in which the present magnet has been magnetized after being machined and a magnet product in which the present magnet has not been magnetized.

<A Manufacturing Method of the R-T-B Based Sintered Magnet>

Figure 2:
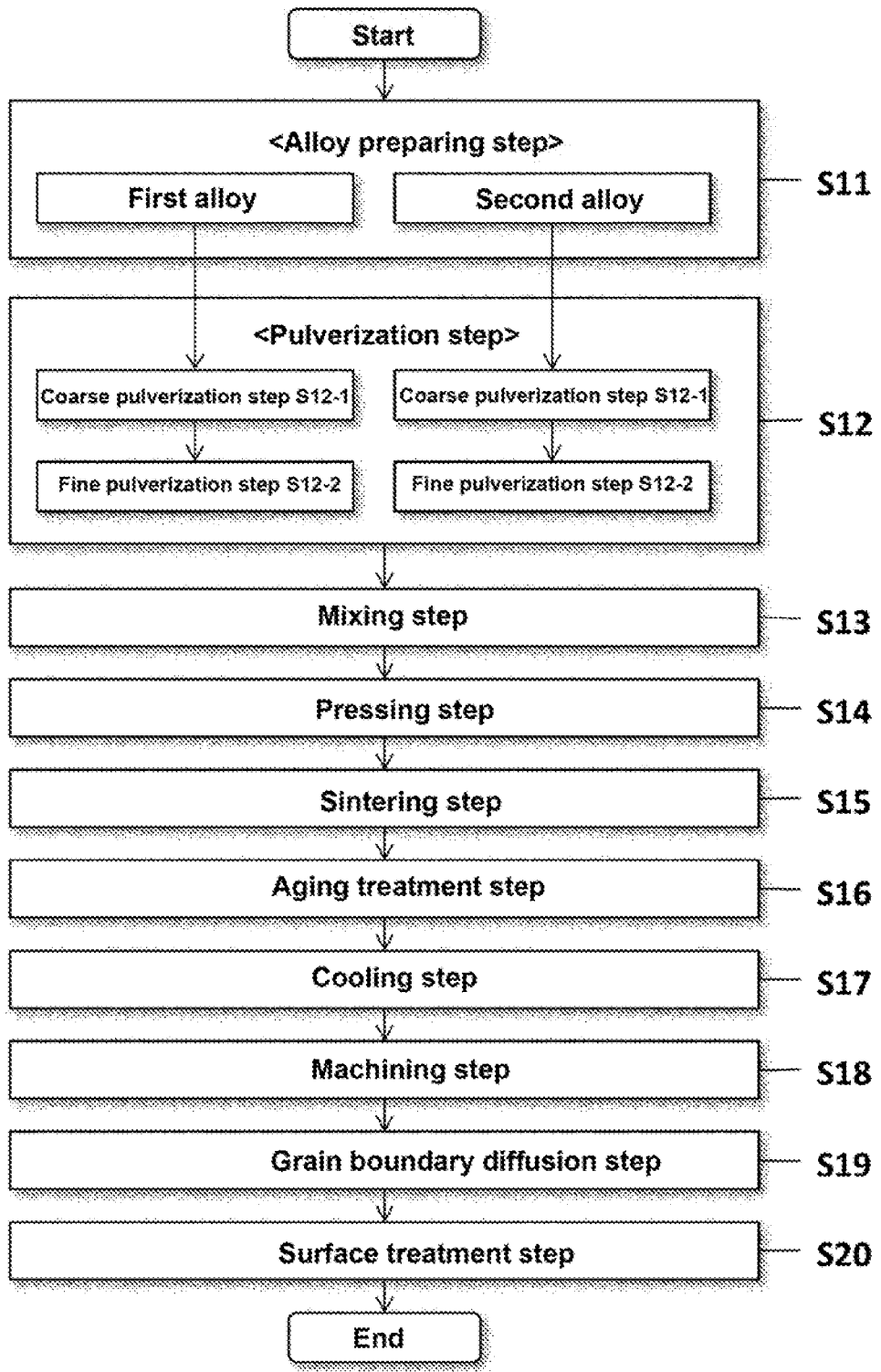
FIG. 2 is a flow chart showing an example of a method for preparing the R-T-B based sintered magnet of the present invention.

An example of the method for manufacturing the R-T-B based sintered magnet of the present embodiment with the configuration above will be descried with reference to the drawings. FIG. 2 is a flow chart showing an example of the manufacturing method of R-T-B based sintered magnet according to an embodiment of the present invention. As shown in FIG. 2, a method for manufacturing the R-T-B based sintered magnet according to the present embodiment contains the following processes.

(a) An alloy preparing step where a first alloy and a second alloy are prepared (Step S11);

(b) A pulverization step where the first alloy and the second alloy are pulverized (Step S12);

(c) A mixing step where the powder of the first alloy powder and the powder of the second alloy are mixed (Step S13);

(d) A pressing step where the mixed powder is pressed (Step S4);

(e) A sintering step where the green compact is sintered to provide an R-T-B based sintered magnet (Step S15);

(f) An aging treatment step where the R-T-B based sintered magnet is subjected to an aging treatment (Step S16);

(g) A cooling step where the R-T-B based sintered magnet is cooled (Step S17);

(h) A machining step where the R-T-B based sintered magnet is machined (Step S18);

(i) A grain boundary diffusion step where a heavy rare earth element is diffused in the grain boundary of the R-T-B based sintered magnet (Step S19);

(j) A surface treatment step where the R-T-B based sintered magnet is subjected to a surface treatment (Step S20).

[An Alloy Preparing Step: Step S11]

An alloy of the base mainly constituting the main phase (a first alloy) and an alloy of the base constituting the grain boundary (a second alloy) of the R-T-B based sintered magnet of the present embodiment are prepared (an alloy preparing step (Step S11)). In this alloy preparing step (Step S11), the raw material metals corresponding to the composition of the R-T-B based sintered magnet according to the present embodiment are melted under vacuum or in an inert gas atmosphere such as Ar gas. Then, they were casted to provide the first alloy and the second alloy each having a desired composition. A two-alloy method where the raw material powder is manufactured by mixing the two alloys (i.e., the first alloy and the second alloy) is described in the present embodiment, but a single-alloy method where a single alloy with the first alloy and the second alloy not separated may also be used.

As the raw material metal, for instance, a rare earth metal, a rare earth alloy, a pure iron, ferro-boron, and further the alloy and compound thereof can be used. A casting method for casting the raw material metals can be, for example, an ingot casting method, a strip casting method, a book molding method, a centrifugal casting method or the like. In the case where segregation occurs, the obtained raw material alloy should be homogenized when required. The homogenization of the raw material alloy is performed by keeping it under vacuum or in an inert atmosphere at a temperature of 700° C. or more and 1500° C. or less for an hour. Thus, the alloy for R-T-B based sintered magnet is melted and homogenized.

[A Pulverization Step: Step S12]

After the first alloy and the second alloy are manufactured, the first alloy and the second alloy are pulverized (a pulverization step (Step S12)). In this pulverization step (Step S12), after the first alloy and the second alloy are manufactured, the first alloy and the second alloy are separately pulverized to make powders. Also, the first alloy and the second alloy may be pulverized together. However, from the view point of controlling the composition deviation, it is more preferable that these alloys are separately pulverized.

The pulverization step (Step S12) includes a coarse pulverization step (Step S12-1) where the alloy is pulverized to have a particle size of several hundreds of μm to several mm and a fine pulverization step (Step S12-2) where the alloy is pulverized to have a particle size of several μm.

(A Coarse Pulverization Step (Step S12-1))

The first alloy and the second alloy are pulverized to provide a particle size of several hundreds of μm to several mm (the coarse pulverization step (Step S12-1)). In this way, the coarsely pulverized powder of the first alloy and the second alloy are thus obtained. The coarse pulverization can be performed as follows. First of all, the hydrogen is stored in the first alloy and the second alloy. Then, the hydrogen is emitted based on the difference of hydrogen storage amount among different phases. And with the dehydrogenation, a self-collapsed-type pulverization (a hydrogen storage pulverization) occurs. In addition, in order to promote the formation of the R—Cu-M-C concentrated part, C can be mixed in the coarsely pulverized powder and then a heat treatment is performed at a temperature ranging from 500 to 900° C.

Further, in addition to the hydrogen storage pulverization mentioned above, the coarse pulverization step (Step S12-1) can be performed by using a coarse pulverizer such as a stamp mill, a jaw crusher, a brown mill and the like in an inert atmosphere.

Further, in order to provide good magnetic properties, the atmosphere of each step, from the pulverization step (Step S12) to the sintering step (Step S15), is preferable with a low concentration of oxygen. The concentration of oxygen can be adjusted by controlling the atmosphere in each manufacturing process. In case the concentration of oxygen is high in each manufacturing process, the rare earth element in the powders of the first alloy and the second alloy is oxidized to generate oxides of R. The oxide of R will be deposited in the grain boundary without being reduced in the sintering process, resulting in a decreased Br in the obtained R-T-B based sintered magnet. Thus, the oxygen concentration in each process is preferably, for example, 100 ppm or less.

(A Fine Pulverization Step: Step S2-2)

After the first alloy and the second alloy are coarsely pulverized, the coarsely pulverized powders of said first alloy and said second alloy are finely pulverized to provide an average particle size of approximately several μm (a fine pulverization step (Step S12-2)). In this way, fine pulverized powders of the first alloy and the second alloy are then obtained. A fine pulverized powder having a particle size of preferably 1 μm or more and 10 μm or less and more preferably 3 μm or more and 5 μm or less can be obtained by further finely pulverizing the coarsely pulverized powder.

Further, although the finely pulverized powder is obtained by separately pulverizing the first alloy and the second alloy in the present embodiment, the fine pulverized powder may be also obtained after mixing the coarsely pulverized powder of the first alloy and that of the second alloy in the fine pulverization step (Step S12-2).

The fine pulverization step is performed by suitably adjusting conditions such as the pulverization time and the like and at the same time performing further pulverization to the coarsely pulverized powder using a fine pulverizer such as a jet mill, a ball mill, a vibrating mill, a wet attritor and the like. The jet mill performs the following pulverization method. The jet mill discharges inert gas (e.g. $N_2$ gas, Ar gas or the like) at a high pressure from a narrow nozzle to produce a high-speeded gas flow. The coarsely pulverized powder of the first alloy and the second alloy is accelerated by this high-speeded gas flow, causing a collision between the coarsely pulverized powders of the first alloy and the second alloy or a collision between the coarsely pulverized powders and a target or the wall of a container.

By adding the pulverization aids such as zinc stearate, oleic amide and the like during the fine pulverization of the coarsely pulverized powders of the first alloy and the second alloy, a finely pulverized powder that can be oriented easily during the pressing process is obtained. Also, in order to form the R—Cu-M-C concentrated part, these powder aids can be used as the carbon resource. Otherwise, other carbon resource can also be used. Alternatively, the carbon also can be introduced into the sintered body of R-T-B based magnet in the subsequent grain-boundary diffusion step with no carbon component for the formation of the R—Cu-M-C concentrated part being added in this step.

[A Mixing Step: Step S13]

After the fine pulverization of the first alloy and the second alloy, the finely pulverized powders are mixed in an atmosphere with a low concentration of oxygen (a mixing step (Step S13)). A mixed powder is then obtained. The atmosphere with a low concentration of oxygen is an inert atmosphere such as $N_2$ gas, Ar gas and the like. The compounding ratio by mass of the first alloy powder to the second alloy powder is preferably 80 to 20 or more and 97 to 3 or less, and more preferably 90 to 10 or more and 97 to 3 or less.

Further, the compounding ratio of the first alloy to the second alloy when they are pulverized together in the pulverization step (Step S12) is the same as that when they are pulverized separately. The compounding ratio by mass of the first alloy powder to the second alloy powder is preferably 80 to 20 or more and 97 to 3 or less, and more preferably 90 to 10 or more and 97 to 3 or less.

In the present embodiment, the first alloy and the second alloy preferably have different compositions. For instance, the second alloy contains more M and Cu compared to the first alloy.

As for the total content of M of at least one selected from the group consisting of Ga, Si, Sn, Ge and Bi in the second alloy, it is preferably 0.2 to 20 mass % and more preferably 0.5 to 10 mass %. The first alloy may or may not contain M. When the first alloy also contains M, the total content of M in the first alloy is preferably 0.2 mass/o or less. The content of Cu in the second alloy is preferably 0.2 to 20 mass % and more preferably 0.5 to 10 mass % of Cu. The first alloy may or may not contain Cu. When the first alloy also contains Cu, the content of Cu in the first alloy is preferably 0.2 mass % or less.

[A Pressing Step: Step S14]

After mixing the first alloy powder and the second alloy powder, the mixed powder is pressed to have a target shape (a pressing step (Step S14)). In the pressing step (Step S14), a mixed powder of the first alloy powder and the second alloy powder is filled in a press mold surrounded by an electromagnet, and then a pressure is applied thereto. In this way, the mixed powder is pressed to provide an arbitrary shape. A magnetic field is applied during that time, and a predetermined orientation is produced to the raw material powder by the applied magnetic field. Then, the raw material powder is pressed with the crystal axis orientated in the magnetic field. Thus, a green compact is obtained. As the green compact is oriented in a particular direction, an anisotropic R-T-B based sintered magnet with stronger magnetism can be provided.

The pressure provided during the pressing process is preferably 30 MPa to 300 MPa. The applied magnetic field is preferably 950 kA/m to 1600 kA/m. The applied magnetic field is not limited to a magnetostatic field, and it can also be a pulsed magnetic field. In addition, a magnetostatic field and a pulsed magnetic field can be used in combination.

Further, in addition to the dry pressing method as described above where the mixed powder is pressed directly, the pressing method can also be a wet pressing where slurry obtained by dispersing the raw material powder in a solvent such as an oil is pressed.

The shape of the green compact obtained by pressing the mixed powder is not particularly limited and can be an arbitrary shape such as a cuboid, a tabular shape, a columnar shape, a ring shape and the like in accordance with the desired shape of the R-T-B based sintered magnet.

[A Sintering Step: Step S15]

The green compact pressed in a magnetic field to have a target shape is sintered under vacuum or in an inert atmosphere so that an R-T-B based sintered magnet is obtained (a sintering step (Step S15)). The sintering temperature is adjusted depending on various conditions such as the composition, pulverization method, the difference of particle size and particle size distribution and the like, and a green compact is sintered by performing a heat treatment under vacuum or in an inert atmosphere at 1000° C. or more and 1200° C. or less for an hour or more and 48 hours or less. Thus, the mixed powder produces a liquid-phase sintering, and then an R-T-B based sintered magnet (a sintered body of R-T-B based sintered magnet) is obtained with an increased volume ratio occupied by the main phase. After the green compact is sintered, the sintered body is preferably cooled rapidly so as to improve the production efficiency. In addition, if the carbon is introduced before the sintering step, a plateau is set at 500 to 700° C. in the heating process. Alternatively, the temperature rises slowly to generate a liquid containing the rare earth element, Cu and M such as Ga. This liquid will react with the introduced carbon, forming the R—Cu-M-C concentrated part. Particularly, when a hydrogen storage pulverization is performed in the coarse pulverization step, then the formation of the R—Cu-M-C concentrated part will be further promoted due to the dehydrogenation reaction caused by such a heat treatment.

[An Aging Treatment Step: Step S16]

After the green compact is sintered, the R-T-B based sintered magnet is subjected to an aging treatment (an aging treatment step (Step S16)). After the sintering process, an aging treatment is provided to the R-T-B based sintered magnet. For example, the obtained R-T-B based sintered magnet is kept in a temperature lower than that in the sintering process. The aging treatment can be, for example, either done in two steps or in one single step. In the two-step heat treatment, the R-T-B based sintered magnet is heated at 700° C. or more and 900° C. or less for 10 minutes to 6 hours and then further heated at 500° C. to 700° C. for 10 minutes to 6 hours. In the single-step heat treatment, the R-T-B based sintered magnet is heated at around 600° C. for 10 minutes to 6 hours. The treatment conditions can be suitably adjusted based on the number of times the aging treatment to be done. With such an aging treatment, the magnetic properties of the R-T-B based sintered magnet can be improved. In addition, the aging treatment step (Step S16) can be performed after a processing step (Step S18) or a grain boundary diffusion step (Step S19).

[A Cooling Step: Step S17]

After an aging treatment is provided to the R-T-B based sintered magnet, the R-T-B based sintered magnet is rapidly cooled in an Ar atmosphere (a cooling step (Step S17)). In this way, the R-T-B based sintered magnet according to the present embodiment is obtained. The cooling rate is not particularly limited, and it is preferably 30° C./min or more.

[A Machining Step: Step S18]

The obtained R-T-B based sintered magnet may be machined to have a desired shape if required (a machining step: Step S18). The machining method can be, for example, a shaping process such as cutting, grinding and the like, and a chamfering process such as barrel polishing and the like.

[A Grain Boundary Diffusion Step: Step S19]

A step wherein R, Cu, M and C for forming the R—Cu-M-C concentrated part is introduced into the grain boundary of the machined R-T-B based sintered magnet through grain boundary diffusion can also be included (a grain boundary diffusion step: Step S19). The grain boundary diffusion can be done by preparing an alloy powder containing, for example, R, Cu and M and attaching the alloy powder to the R-T-B based sintered magnet followed by a heat treatment. Alternatively, this process can be performed by attaching each element to the surface of the R-T-B based sintered magnet by evaporation and then providing a heat treatment. Further, for instance, if carbon functions as a diffusion component in the alloy powder, R, Cu, M and C can be introduced together into the grain boundary, which is effective for the formation of the R—Cu-M-C concentrated pan. On the other hand, to further improve the coercivity of the R-T-B based sintered magnet, some heavy rare earth element such as Dy and Tb can be contained in part of or the whole diffusion element R. After the grain boundary diffusion treatment, some heat treatments for forming the R—Cu-M-C concentrated part may be suitably further performed. At the end of the grain boundary diffusion step, an aging treatment can be provided at around 500 to 600° C. for 0.5 to 5 hours for better magnetic properties.

[A Surface Treatment Step: Step S20]

A surface treatment such as plating, resin coating, oxidization treatment, chemical treatment and the like can be provided to the R-T-B based sintered magnet obtained from the steps above (a surface treatment step (Step S20)). Thus, the corrosion resistance can be further improved.

In addition, although the machining step (Step S18), the grain boundary diffusion step (Step S19) and the surface treatment step (Step S20) are performed in the present embodiment, these steps are not necessary to be performed.

As mentioned above, the R-T-B based sintered magnet according to the present embodiment is manufactured as above, and the treatments are completed. In addition, a magnet product can be obtained by magnetizing the obtained magnet.

The thus obtained R-T-B based sintered magnet according to the present embodiment has excellent corrosion resistance and good magnetic properties as an R—Cu-M-C concentrated part exists in the grain boundary.

When the R-T-B based sintered magnet of the present embodiment is used as a magnet in a rotating machine such as a motor, it can be used over a long term because of good corrosion resistance. Also, an R-T-B based sintered magnet with a high reliability can be provided. The R-T-B based sintered magnet of the present embodiment can be suitably used as a magnet in, for example, a surface permanent magnet type motor with an magnet attached on the surface of a rotor, an interior permanent magnet type motor such as an inner rotor type brushless motor, a PRM (permanent magnet reluctance motor) or the like. In particular, the R-T-B based sintered magnet of the present embodiment is applicable to a spindle motor for a hard disk rotating drive or a voice coil motor in a hard disk drive, a motor for an electric vehicle or a hybrid car, a motor for an electric power steering motor in an automobile, a servo motor for a machine tool, a motor for a vibrator in a cellular phone, a motor for a printer, a motor for a generator and the like.

<A Motor>

Figure 3:
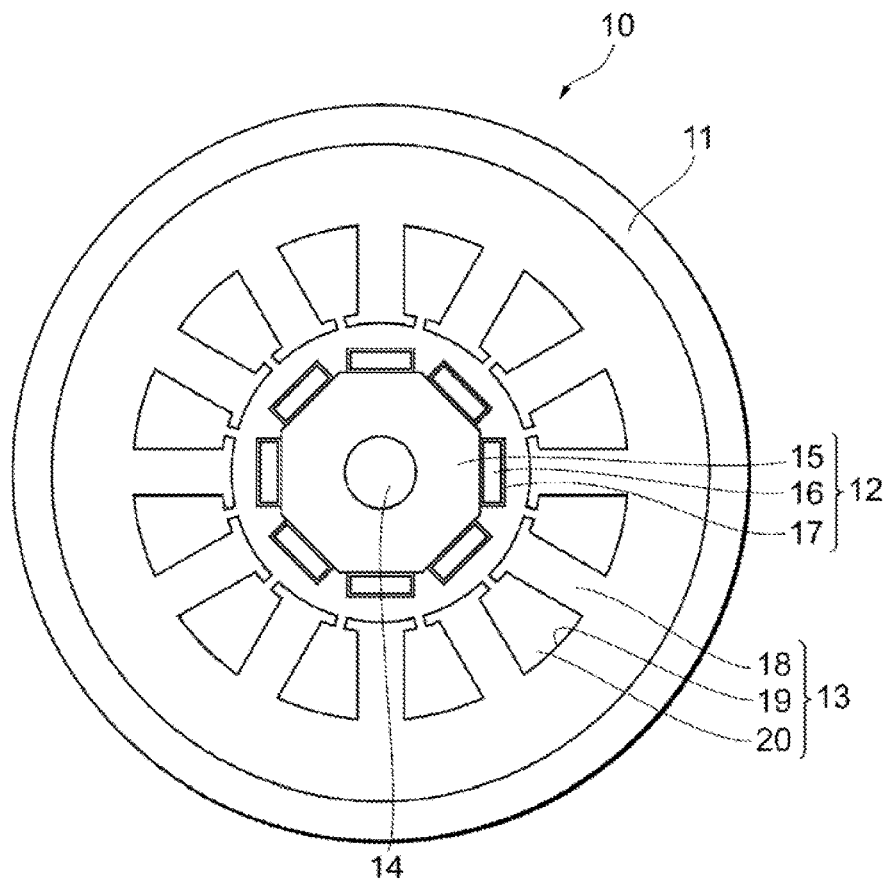
FIG. 3 is a sectional view briefly showing the configuration of a motor in one embodiment.
Figure 4:
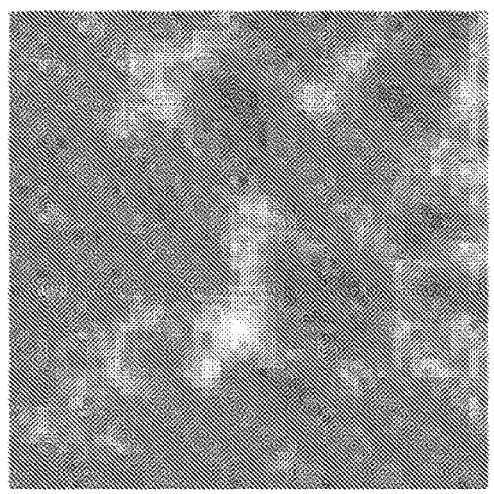
FIG. 4 is an enlarged view (10 μm×10 μm) showing the mapping data about Nd in a cross-section in the R-T-B based sintered magnet of Example 2.
Figure 5:
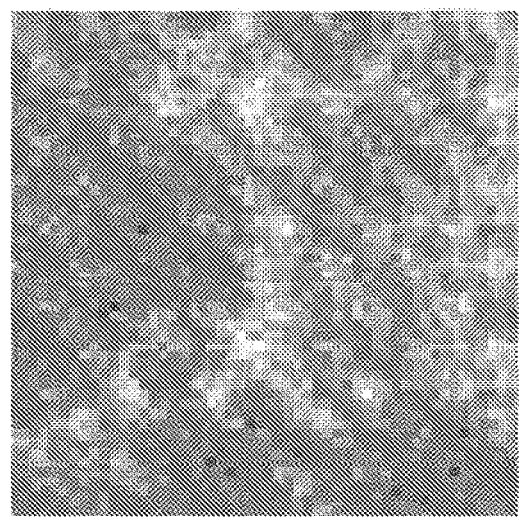
FIG. 5 is an enlarged view (10 μm×10 μm) showing the mapping data about Pr in a cross-section in the R-T-B based sintered magnet of Example 2.
Figure 6:
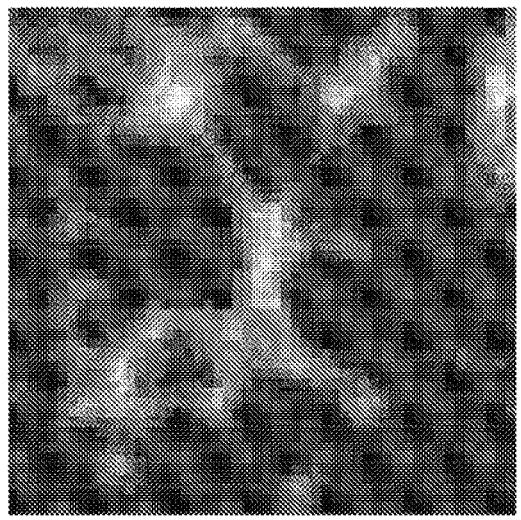
FIG. 6 is an enlarged view (10 μm×10 μm) showing the mapping data about Cu in a cross-section in the R-T-B based sintered magnet of Example 2.
Figure 7:
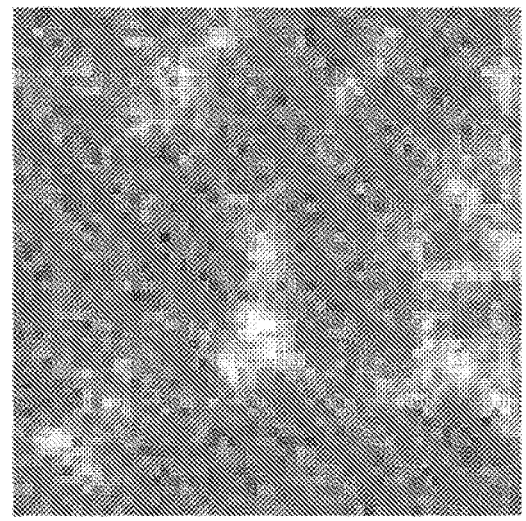
FIG. 7 is an enlarged view (10 μm×10 μm) showing the mapping data about Ga in a cross-section in the R-T-B based sintered magnet of Example 2.
Figure 8:
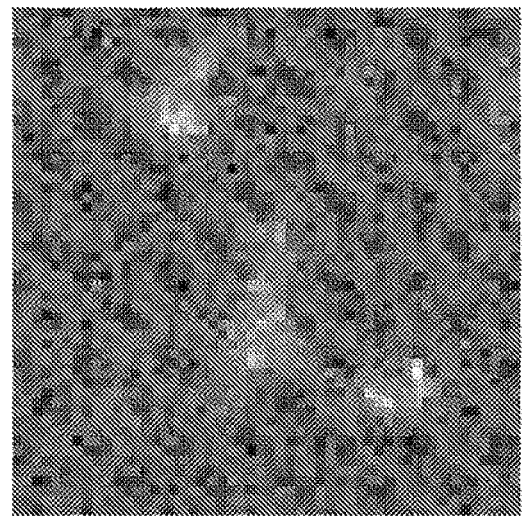
FIG. 8 is an enlarged view (10 μm×10 μm) showing the mapping data about C in a cross-section in the R-T-B based sintered magnet of Example 2.

Next, a preferable embodiment of the R-T-B based sintered magnet according to the present embodiment used in a motor will be described. Here, an example of the R-T-B based sintered magnet according to the present embodiment applied to an SPM motor is described. FIG. 3 is a sectional view briefly showing the configuration of an embodiment of the SPM motor. As shown in FIG. 3, the SPM motor 10 is provided with a columnar rotor 12, a cylindrical stator 13 and a rotary shaft 14 in a housing 11. The rotary shaft 14 goes through the center of cross-section of rotor 12.

The rotor 12 is provided with a columnar rotor core (iron core) 15 composed of iron and the like, a plurality of permanent magnets 16 arranged with a predetermined spacing on the outer peripheral surface of the rotor core 15 and a plurality of magnet insertion slots 17 taking in the permanent magnets 16. The R-T-B based sintered magnet according to the present embodiment is used as the permanent magnet 16. A plurality of permanent magnets 16 are arranged in each magnet insertion slot 17 with the N-pole and the S-pole deposited alternately in a circumferential direction of the rotor 12. Thus, permanent magnets 16 adjacent in the circumferential direction generate magnetic field lines in mutually reversed directions along the radial direction of rotor 12.

The stator 13 is provided with a plurality of stator cores 18 and throttles 19 arranged with a predetermined spacing in a circumferential direction of the inner side of its cylindrical wall (peripheral wall) along the outer peripheral surface of the rotor 12. The plurality of stator cores 18 are arranged so as to be directed toward the stator 13 and opposed to the rotor 12. Further, a coil 20 is wound around inside each throttle 19. The permanent magnet 16 and the stator core 18 are arranged to face each other.

The rotor 12 together with the rotary shaft 14 is installed in an inner space inside the stator 13 in a rotatable way. The stator 13 provides torque to the rotor 12 via an electromagnetic action so that the rotor 12 rotates in the circumferential direction.

The SPM motor 10 uses the R-T-B based sintered magnet according to the present embodiment as the permanent magnet 16. The permanent magnet 16 shows corrosion resistance while exhibiting good magnetic properties. Thus, the SPM motor 10 is thus capable of improving the properties of the motor such as the torque characteristic and also showing a high output power for a long term. In this respect, it is excellent in reliability.

The present invention will not be limited to the embodiment above, and various modifications are available within the scope of the present invention.

EXAMPLES

Hereinafter, examples will be listed to illustrate the present invention in more details. However, the present invention will not be limited to the following examples.

First of all, the raw material alloys were prepared by a strip casting method to provide a sintered magnet with a magnet composition I or II as shown in Table 1 or 2. As the raw material alloys, four alloys, i.e., a first alloy A and B mainly constituting the main phase of the magnet and a second alloy a and b mainly constituting the grain boundary, were respectively prepared. In addition, in Table 1 and Table 2 (also applicable to Table 3), bal. referred to the residual amount when each of the whole alloy was deemed as 100 mass %, and (T.RE) represented the sum of the rare earth elements (mass %).

TABLE 1

| | Composition (mass %) | | | | | | | | | |
|---|---|---|---|---|---|---|---|---|---|---|
| | Nd | Pr | (T. RE) | Co | Ga | Al | Cu | B | Fe | Mass ratio |
| First alloy A | 23.5 | 6.5 | 30.0 | 0.5 | 0.0 | 0.2 | 0.0 | 1.0 | bal. | 95 |
| Second alloy a | 39.0 | 11.0 | 50.0 | 10.0 | 4.0 | 0.2 | 6.0 | 0.0 | bal. | 5 |
| Magnet composition I | 24.3 | 6.7 | 31.0 | 1.0 | 0.2 | 0.2 | 0.3 | 0.9 | bal. | |

TABLE 2

| | Composition (mass %) | | | | | | | | | Mass ratio |
|---|---|---|---|---|---|---|---|---|---|---|
| | Nd | Pr | (T. RE) | Co | Ga | Al | Cu | B | Fe | |
| First alloy B | 23.5 | 6.5 | 30.0 | 0.5 | 0.0 | 0.2 | 0.0 | 1.0 | bal. | 95 |
| Second alloy b | 39.0 | 11.0 | 50.0 | 10.0 | 8.0 | 0.2 | 10.0 | 0.0 | bal. | 5 |
| Magnet composition II | 24.3 | 6.7 | 31.0 | 1.0 | 0.4 | 0.2 | 0.50 | 0.9 | bal. | |

Next, after hydrogen was stored in the alloy at room temperature, a dehydrogenation process was performed at 600° C. for an hour in an Ar atmosphere to perform a hydrogen pulverization treatment (coarse pulverization).

In addition, in the present example, each step, from the hydrogen pulverization treatment to the sintering process (the fine pulverization and pressing process), was done in an Ar atmosphere with the oxygen concentration therein being lower than 50 ppm (same conditions were applied in the following examples and comparative examples).

Next, for each alloy, after the hydrogen pulverization and before the fine pulverization, 0.1 wt % of zinc stearate was added to the coarsely pulverized powder as a pulverization aid. Then, the mixture was mixed by a Nauta mixer. Here, in addition to the zinc stearate, 0.1 mass % of carbon black was added only in the second alloy b with the magnet composition II. And then, a jet mill was used to perform the fine pulverization so as to provide a finely pulverized powder having an average particle size of around 4.0 μm.

Subsequently, the obtained finely pulverized powder of the first alloy and that of the second alloy were mixed in a weight ratio of 95:5 using the Nauta mixer so that a mixed powder of the raw material powder of the R-T-B based sintered magnet was prepared.

The obtained mixed powder was filled in a press mold arranged in an electromagnet and the powder was pressed under an applied pressure of 120 MPa in a magnetic field of 1200 kA/m. In this way, the green compact was obtained.

After that, the green compact was sintered under vacuum at 1060° C. for 4 hours and then rapidly cooled to provide a sintered body (the R-T-B based sintered magnet) having the magnet composition I as shown in Table 1. Next, the obtained magnet was machined as a cuboid of 13.2 mm×8.2 mm×4.2 mm, and the orientation direction of the c axis of the $R_2T_{14}B$ grain became the thickness direction (the thickness is 4.2 mm).

Comparative Example 1

A sintered body with the magnet composition I which was obtained by the method mentioned above was subjected to a two-step aging treatment in which the treatment was firstly done at 850° C. for 1 hour and then at 540° C. for 2 hours (both under an Ar atmosphere). Thereafter, 0.1 mm in each surface of the sintered body was ground off using a processing machine to provide an R-T-B based sintered magnet of 13 mm×8 mm×4 mm. This magnet was used as Comparative Example 1.

Example 1

A sintered body with the magnet composition II which was obtained by the method mentioned above was subjected to a two-step aging treatment in which the treatment was firstly done at 850° C. for 1 hour and then at 540° C. for 2 hours (both under an Ar atmosphere). Thereafter, 0.1 mm in each surface of the sintered body was ground off using a processing machine to provide an R-T-B based sintered magnet of 13 mm×8 mm×4 mm. This magnet was used as Example 1.

Examples 2 to 6

Examples 2 to 6 are examples where Cu, Ga, Si, Ge, Bi and C were introduced into the grain boundary by the grain boundary diffusion method in an R-T-B based sintered magnet with a magnet composition I, trying to form an R—Cu-M-C concentrated part. Table 3 showed the composition in weight of the prepared diffusion resources. Metal simple substances were weighed according to the composition as shown in Table 3 and were then subjected to 3 times of melting and casting process repeatedly in an arc melting furnace to prepare an alloy. The obtained alloy was melted by high frequency induction heating, and then the molten metal was rapidly cooled by using a roll to provide a melt-spun ribbon. The obtained melt-spun ribbon was coarsely pulverized in an Ar atmosphere in a glove box and was then put into a sealed container together with a medium made of iron in an Ar atmosphere. Then, a pulverization process was done in the sealed container to provide a powder with an average particle size of 10 to 20 μm. A binder resin was added to the powder of diffusion material, and an alcohol was used as a solvent to prepare a paint of the diffusion material. As for the mixing ratio, when the weight of the powder of diffusion material was deemed as 100), the fine powder of butylal as the binder resin and the alcohol respectively accounted for 2 and 100. The mixture was added into a cylindrical container made of resin with a lid in an Ar atmosphere, and then the lid was covered. The container was placed on the stand of a ball mill and rotated at 120 rpm for 24 hours so that the mixture turned to a paint. A machined product of the sintered body with the magnet composition I was immersed in the obtained paint and then picked out for drying. Such a procedure was repeated until the paint was coated on the machined product of sintered body in an amount that is 2.5% of weight of the machined product. Thereafter, the machined product was subjected to a heat treatment in an Ar atmosphere at 900° C. for 6 hours and then at 540° C. for 2 hours. After the heat treatment, the residues of the diffusion material on the surface of the sintered body was slightly peeled off by a sand paper, and then 0.1 mm in each surface was ground off by using a processing machine to provide an R-T-B based sintered magnet. The samples were prepared by the method mentioned above using the diffusion material with each composition shown in Table 3. In this way. Examples 2 to 6 were completed.

TABLE 3

| Applicable Example | Coating amount % | Composition of diffusion material (mass %) | | | | | | |
|---|---|---|---|---|---|---|---|---|
| | | Nd | Cu | Ga | Si | Ge | Sn | Bi | C |
| Example 2 | 2.5 | 79 | 10 | 10 | 0 | 0 | 0 | 0 | 1 |
| Example 3 | 2.5 | 79 | 10 | 0 | 10 | 0 | 0 | 0 | 1 |
| Example 4 | 2.5 | 79 | 10 | 0 | 0 | 10 | 0 | 0 | 1 |

TABLE 3-continued

| Applicable Example | Coating amount % | Composition of diffusion material (mass %) | | | | | | |
|---|---|---|---|---|---|---|---|---|
| | | Nd | Cu | Ga | Si | Ge | Sn | Bi | C |
| Example 5 | 2.5 | 79 | 10 | 0 | 0 | 0 | 10 | 0 | 1 |
| Example 6 | 2.5 | 79 | 10 | 0 | 0 | 0 | 0 | 10 | 1 |
| Example 7 | 1.6 | 79 | 10 | 10 | 0 | 0 | 0 | 0 | 1 |
| Example 8 | 0.6 | 79 | 10 | 10 | 0 | 0 | 0 | 0 | 1 |

Examples 7 to 8

Examples 7 to 8 are examples where Ga was introduced into the grain boundary by the grain boundary diffusion method in an R-T-B based sintered magnet with a magnet composition I, trying to form an R—Cu—Ga—C concentrated part. A machined product of sintered body with the magnet composition I was immersed in the paint made of a diffusion material containing Ga as shown in Table 3 and then picked out for drying. Such a procedure was repeated until the paint coated on the machined product of sintered body is in an amount of 1.6% and 0.6% of weight of the sintered body respectively in Example 7 and Example 8. Thereafter, a heat treatment in an Ar atmosphere at 900° C. for 6 hours and then at 540° C. for 2 hours was performed. After the heat treatment, the residues of the diffusion material on the surface of the sintered body was slightly peeled off by a sand paper, and then 0.1 mm in each surface was ground off by using a processing machine to provide an R-T-B based sintered magnet of 13 mm×8 mm×4 mm in Examples 7 and 8.

<Estimation>

[Composition Analysis]

Figure 9:
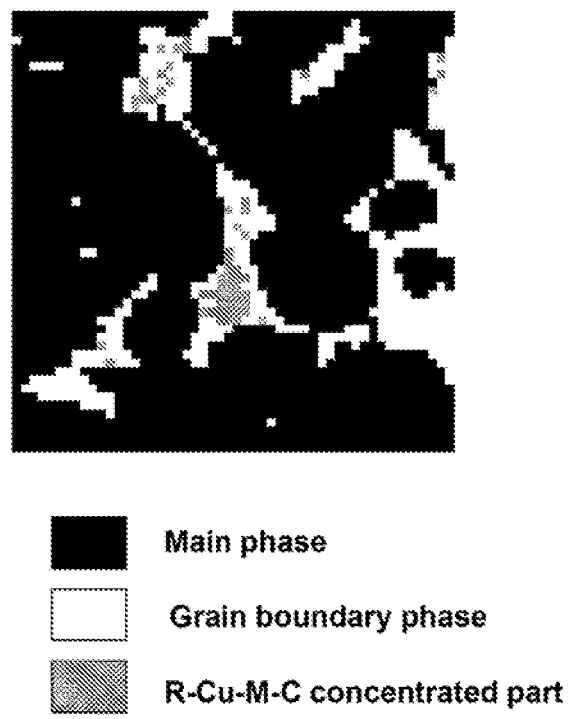
FIG. 9 is a view showing an example of the areas (the R—Cu-M-C concentrated parts) where the concentration of each element including R, Cu, M and C is higher than that in the main phase grain in the cross-section in the R-T-B based sintered magnet of Example 2.

A composition analysis was performed on the R-T-B based sintered magnets obtained in Examples 1 to 8 and Comparative Example 1 by an X-ray fluorescence analysis and an inductively coupled plasma mass spectrometry (ICP-MS method). The results were shown in Table 4.

show the observed result obtained by EPMA of each element including Nd, Cu, M and C in a section of the R-T-B based sintered magnet of Example 1. In addition, in the section of the R-T-B based sintered magnet from Example 1, the area (the R—Cu-M-C concentrated part) where the concentration of each element including R(Nd, Pr), Cu, M (Ga) and C is more densely distributed than that in the grains of the main phase was shown in FIG. 9.

<Calculation of Area Ratio Occupied by the R—Cu-M-C Concentrated Part in Grain Boundary>

The area ratio (A/B) of the R—Cu-M-C concentrated part occupied in the grain boundary was calculated from the mapping data of the R-T-B based sintered magnet from Examples 1 to 8 and Comparative Example 1 in the following procedure.

(1) A backscattered electron image was binarized at a predetermined level, and the main-phase grain part and the grain boundary part were specified. Also, the area (B) of the grain boundary part was calculated. In addition, the binarization was performed based on the signal intensity of the backscattered electron image. It was known that the signal intensity of the backscattered electron image became stronger when a higher content of an element having large atom number was contained. More rare earth element having a large atom number existed in the grain boundary part than in the main phase part, and it was a generally used method to perform a binarization at a predetermined level so as to specify the main phase grain part and the grain boundary part. In addition, even if a part was generated that had not been specified as the grain boundary between two grains in the binarization, this part falls within the error range of the entire grain boundary part, which provided no affect on the number range in the calculation of the grain boundary part (B).

(2) The average and the standard deviation of the intensity of characteristic X-ray were calculated for each element including R, Cu, M and C in the main phase grain part

TABLE 4

| | Composition (mass %) | | | | | | | | | | | | |
|---|---|---|---|---|---|---|---|---|---|---|---|---|---|
| | Nd | Pr | (T. RE) | Cu | Ga | Si | Ge | Sn | Bi | C | Co | Al | B | Fe |
| Comparative Example 1 | 24.3 | 6.7 | 31.0 | 0.30 | 0.20 | 0.00 | 0.00 | 0.00 | 0.00 | 0.06 | 1.0 | 0.2 | 0.9 | bal. |
| Example 1 | 24.3 | 6.7 | 31.0 | 0.50 | 0.40 | 0.00 | 0.00 | 0.00 | 0.00 | 0.08 | 1.0 | 0.2 | 0.9 | bal. |
| Example 2 | 24.6 | 6.7 | 31.3 | 0.51 | 0.40 | 0.00 | 0.00 | 0.00 | 0.00 | 0.07 | 1.0 | 0.2 | 0.9 | bal. |
| Example 3 | 24.7 | 6.7 | 31.4 | 0.51 | 0.00 | 0.18 | 0.00 | 0.00 | 0.00 | 0.08 | 1.0 | 0.2 | 0.9 | bal. |
| Example 4 | 24.5 | 6.7 | 31.2 | 0.50 | 0.00 | 0.00 | 0.21 | 0.00 | 0.00 | 0.08 | 1.0 | 0.2 | 0.9 | bal. |
| Example 5 | 24.6 | 6.7 | 31.3 | 0.50 | 0.00 | 0.00 | 0.00 | 0.19 | 0.00 | 0.08 | 1.0 | 0.2 | 0.9 | bal. |
| Example 6 | 24.7 | 6.7 | 31.4 | 0.51 | 0.00 | 0.00 | 0.00 | 0.00 | 0.20 | 0.07 | 1.0 | 0.2 | 0.9 | bal. |
| Example 7 | 24.6 | 6.7 | 31.4 | 0.42 | 0.33 | 0.00 | 0.00 | 0.00 | 0.00 | 0.07 | 1.0 | 0.2 | 0.9 | bal. |
| Example 8 | 24.6 | 6.7 | 31.3 | 0.37 | 0.25 | 0.00 | 0.00 | 0.00 | 0.00 | 0.07 | 1.0 | 0.2 | 0.9 | bal. |

[Structure]

<Observation on Element Distribution>

After a surface of a cross-section of the obtained R-T-B based sintered magnet from Examples 1 to 8 and Comparative Example 1 was milled by an ion milling so as to remove the influence caused by the oxidation in the outermost surface or the like, the element distribution in the cross-section of the R-T-B based sintered magnet was observed by EPMA (Electron Probe Micro Analyzer) and analyzed accordingly. In an area of 50 μm×50 μm, the structure of the R-T-B based sintered magnet from Example 4 was observed by EPMA. Also, an elemental mapping (256 points×256 points) was performed by EPMA. FIGS. 4 to 8 respectively specified in (1) above based on the mapping data of the intensity of characteristic X-ray of R, Cu, M and C obtained by EPMA.

(3) Based on the mapping data of the intensity of characteristic X-ray of R, Cu, M and C obtained by EPMA, an area having an intensity value of characteristic X-ray higher than the value of (average+3×standard deviation) of the intensity of characteristic X-ray in the main phase crystal grain part which was obtained in (2) above was determined for each element and the part was defined as the part (the concentrated part) where the concentration of the element is higher than that in the grain-phase grains.

(4) In the concentrated part of each element specified in (3) above, the concentrated part of R was the part where any one of the R elements (Nd and Pr in Example 2) was distributed in a high concentration. The concentrated part of Cu was a part where Cu was distributed in a high concentration. In addition, when several kinds of M were contained, the concentrated part of M was a part where any one of M was distributed in a high concentration. Further, the concentrated part of C was a part where C was distributed in a high concentration.

(5) The part where the grain boundary specified in (1) above and the part with R, Cu, M and C distributed in a higher concentration than the main phase grains as specified in (4) above totally overlapped was defined as the R—Cu-M-C concentrated part in the grain boundary and the area (A) of this part was calculated.

(5) The area ratio (A/B) of the R—Cu-M-C concentrated part to the grain boundary was calculated by dividing the area (A) of the R—Cu-M-C concentrated part as calculated in (4) above by the area (B) of the grain boundary as calculated in (1) above.

The calculated area ratio (A/B) of the R—Cu-M-C concentrated part to the grain boundary was shown in Table 5 for each R-T-B based sintered magnet from Examples 1 to 8 and Comparative Example 1.

TABLE 5

| | Area of R—Cu—M—C concentrated part(%) | (Cu + M)/R Minimum | (Cu + M)/R Maximum | Weight loss after saturation type PCT (Pressure Cooker Test) for 200 hours(mg/cm²) | Magnetic properties Br (mT) | Magnetic properties HcJ (kA/m) |
|---|---|---|---|---|---|---|
| Comparative Example 1 | 0.0 | — | — | 33.1 | 1382 | 1230 |
| Example 1 | 0.2 | 0.10 | 0.77 | 12.0 | 1380 | 1290 |
| Example 2 | 2.8 | 0.21 | 0.59 | 0.3 | 1366 | 1320 |
| Example 3 | 2.2 | 0.26 | 0.55 | 0.9 | 1365 | 1282 |
| Example 4 | 2.1 | 0.22 | 0.47 | 0.8 | 1370 | 1274 |
| Example 5 | 1.4 | 0.14 | 0.66 | 3.5 | 1375 | 1250 |
| Example 6 | 1.2 | 0.10 | 0.72 | 4.5 | 1370 | 1306 |
| Example 7 | 1.2 | 0.15 | 0.52 | 5.0 | 1369 | 1302 |
| Example 8 | 0.3 | 0.10 | 0.39 | 9.1 | 1376 | 1285 |

(Calculation of Ratio ((Cu+M)/R) of Cu and M Atoms to R Atom)

Next, a quantitative analysis was done to the composition of the R—Cu-M-C concentrated part. For the R—Cu-M-C concentrated part specified by EPMA mapping, the quantitative analysis to each element was performed by EPMA. Based on the obtained concentration of each element, the ratio ((Cu+M)/R) of the Cu atom and M atom to all the R atoms was calculated. The (Cu+M)/R value was calculated for ten points in one sample. The maximal value and the minimal value of (Cu+M)/R in each sample were shown in Table 5. In addition, as an example to show the composition of the R—Cu-M-C concentrated part, the analysis results and the (Cu+M)/R value of the R-T-B based sintered magnet from Example 2 were shown in Table 6.

TABLE 6

| | | Composition ratio (atomic %) | | | | | |
|---|---|---|---|---|---|---|---|
| | | Nd | Pr | Fe | Cu | Ga | C | (Cu + M)/R |
| Example 2 | Grain boundary phase Point 1 | 31 | 6 | 23 | 4 | 4 | 14 | 0.21 |

TABLE 6-continued

| | Composition ratio (atomic %) | | | | | | |
|---|---|---|---|---|---|---|---|
| | Nd | Pr | Fe | Cu | Ga | C | (Cu + M)/R |
| Grain boundary phase Point 2 | 28 | 6 | 23 | 13 | 3 | 11 | 0.46 |
| Grain boundary phase Point 3 | 36 | 7 | 14 | 5 | 7 | 16 | 0.27 |
| Grain boundary phase Point 4 | 32 | 6 | 16 | 16 | 3 | 13 | 0.49 |
| Grain boundary phase Point 5 | 33 | 6 | 14 | 4 | 6 | 15 | 0.26 |
| Grain boundary phase Point 6 | 32 | 6 | 16 | 16 | 7 | 13 | 0.59 |
| Grain boundary phase Point 7 | 28 | 7 | 10 | 5 | 5 | 12 | 0.29 |
| Grain boundary phase Point 8 | 38 | 6 | 18 | 9 | 5 | 14 | 0.34 |
| Grain boundary phase Point 9 | 25 | 7 | 8 | 4 | 9 | 9 | 0.39 |
| Grain boundary phase Point 10 | 32 | 6 | 21 | 19 | 2 | 18 | 0.55 |
| Main phase | 9 | 2 | 72 | 0 | 0 | 0 | 0.02 |

[Magnetic Properties]

For each example and comparative example, three pieces of sample (13 mm×8 mm×4.0 mm) were laminated and magnetized in a pulsed magnetic field of 3 T. Then, the demagnetization curve was measured by a B-H tracer. The residual magnetic flux density Br and the coercivity HcJ obtained from the demagnetization curve were shown in Table 5.

(Corrosion Resistance)

The R-T-B based sintered magnets from Comparative Examples 1 and Examples 1 to 8 were placed in a PCT (Pressure Cooker Test) chamber for 200 hours in an atmosphere of saturated water vapor with 100% relative humidity and 2 atm at 120° C. The weight loss due to corrosion was estimated. And the results were shown in Table 5.

The comparison of the microscopic structure, corrosion resistance and magnetic properties among samples were described here. As shown in Table 5, no R—Cu-M-C concentrated part was confirmed in the sample from Comparative Example 1. On the other hand, the existence of the R—Cu-M-C concentrated part was confirmed in the samples from Examples 1 to 8. Further, the weight loss (which was the index for corrosion resistance) after the sample was put in the PCT chamber for 200 hours will decrease along with the increasing of the area of the R—Cu-M-C concentrated part occupied in the grain boundary, and the corrosion resistance improved.

As the area of the R—Cu-M-C concentrated part occupied in the grain boundary increased, the corrosion resistance tended to improve. If the area of the R—Cu-M-C concentrated part occupied in the grain boundary was 1% or more, the effect was especially good. Furthermore, in Examples 2, 3 and 4 where especially good results were provided, the area was 2% or more.

In addition, if the (Cu+M)/R value obtained from the composition of the R—Cu-M-C concentrated part was focused, it could be known that the (Cu+M)/R value was shown to be 0.2 to 0.6 in the Examples 2 to 4 which provided specially good corrosion resistance. In other examples, the minimal value was less than 0.2 or the maximal value was higher than 0.6, or both conditions were met. In other words, the composition of the R—Cu-M-C concentrated part was thought to have a most preferable range for the improvement of corrosion resistance. In that range, the corrosion cycle caused by the hydrogen storage in the grain boundary can be effectively prevented from developing.

If the magnetic properties were considered, compared to the comparative examples, the residual magnetic flux density Br decreased less and the coercivity HcJ slightly increased in the examples. That was, in the examples, the magnetic properties were well maintained and at the same time the corrosion resistance was greatly improved.

Table 6 showed an example of the composition of the R—Cu-M-C concentrated part which was determined in Example 2 exhibiting especially good corrosion resistance.

Examples 9 to 12

The R-T-B based sintered magnets with the magnet compositions III to VI as shown in Tables 7 to 10 were prepared. The process from starting to the pressing step was processed in the same method as that in Example 1. In fine pulverization of the second alloy of each example, 0.1 mass % of carbon black was added in addition to 0.1 mass % of zinc stearate. The mixing process of the obtained first alloy with the second alloy and also the pressing process were done as in Comparative Example 1. The sintering process was performed at a temperature as shown in Table 11 for 4 hours followed by a rapid cooling. Thereafter, a two-step aging treatment was provided at 850° C. for 1 hour and then at 540° C. for 2 hours (both under an Ar atmosphere). Then, 0.1 mm in each surface of the sintered body was grounded off by a processing machine to provide R-T-B based sintered magnets of 13 mm×8 mm×4 mm. The thickness direction (the thickness is 4 mm) was the orientation direction of the c axis of $R_2T_{14}B$ grains.

TABLE 7

| | Composition (mass %) | | | | | | | | | | |
|---|---|---|---|---|---|---|---|---|---|---|---|
| | Nd | Pr | (T. RE) | Co | Ga | Al | Cu | Zr | B | Fe | Mass ratio |
| First alloy C | 23.50 | 6.50 | 30.00 | 0.00 | 0.00 | 0.03 | 0.00 | 1.67 | 1.05 | bal. | 90 |
| Second alloy c | 30.00 | 10.00 | 40.00 | 10.00 | 8.00 | 0.03 | 5.00 | 0.00 | 0.00 | bal. | 10 |
| Magnet composition III | 24.15 | 6.85 | 31.00 | 1.00 | 0.80 | 0.03 | 0.50 | 1.50 | 0.95 | bal. | |

TABLE 8

| | Composition (mass %) | | | | | | | | | | |
|---|---|---|---|---|---|---|---|---|---|---|---|
| | Nd | Pr | (T. RE) | Co | Ga | Al | Cu | Zr | B | Fe | Mass ratio |
| First alloy D | 25.20 | 7.02 | 32.22 | 1.67 | 0.22 | 0.10 | 0.00 | 0.00 | 0.83 | bal. | 90 |
| Second alloy d | 30.00 | 10.00 | 40.00 | 15.00 | 8.00 | 0.10 | 5.00 | 0.00 | 0.00 | bal. | 10 |
| Magnet composition IV | 25.68 | 7.32 | 33.00 | 3.00 | 1.00 | 0.10 | 0.50 | 0.00 | 0.75 | bal. | |

TABLE 9

| | Composition (mass %) | | | | | | | | | | |
|---|---|---|---|---|---|---|---|---|---|---|---|
| | Nd | Dy | (T. RE) | Co | Ga | Al | Cu | Zr | B | Fe | Mass ratio |
| First alloy E | 29.00 | 0.20 | 29.20 | 0.50 | 0.00 | 0.62 | 0.00 | 0.10 | 0.95 | bal. | 97 |
| Second alloy e | 40.00 | 0.00 | 40.00 | 12.00 | 3.20 | 0.10 | 2.20 | 0.00 | 0.00 | bal. | 3 |
| Magnet composition V | 29.33 | 0.19 | 29.52 | 0.85 | 0.10 | 0.60 | 0.07 | 0.10 | 0.92 | bal. | |

TABLE 10

| | Composition (mass %) | | | | | | | | | | |
|---|---|---|---|---|---|---|---|---|---|---|---|
| | Nd | Pr | (T RE) | Co | Ga | Al | Cu | Zr | B | Fe | Mass ratio |
| First alloy F | 23.70 | 7.90 | 31.60 | 0.00 | 0.10 | 0.25 | 0.00 | 0.40 | 0.88 | bal. | 95 |
| Second alloy f | 30.00 | 10.00 | 40.00 | 10.00 | 10.00 | 0.25 | 6.00 | 0.00 | 0.00 | bal. | 5 |
| Magnet composition VI | 24.02 | 8.01 | 32.02 | 0.50 | 0.60 | 0.25 | 0.30 | 0.38 | 0.84 | bal. | |

TABLE 11

| Magnet composition | Sintering temperature (° C.) | R—Cu—M—C concentrated part Area (%) | (Cu + M)/R Minimum | (Cu + M)/R Maximum | Weight loss after saturation type PCT (Pressure Cooker Test) for 200 hours(mg/cm$^2$) | Magnetic properties Br (mT) | Magnetic properties HcJ (kA/m) |
|---|---|---|---|---|---|---|---|
| Example 1  | II  | 1060 | 0.2 | 0.10 | 0.77 | 12.0 | 1380 | 1290 |
| Example 9  | III | 1060 | 0.4 | 0.12 | 0.71 | 11.8 | 1370 | 1295 |
| Example 10 | IV  | 1040 | 0.1 | 0.03 | 0.65 | 12.9 | 1380 | 1288 |
| Example 11 | V   | 1060 | 0.1 | 0.05 | 0.54 | 15.4 | 1374 | 1281 |
| Example 12 | VI  | 1040 | 0.2 | 0.12 | 0.81 | 11.5 | 1369 | 1287 |
| Example 13 | II  | 1060 | 1.2 | 0.21 | 0.52 | 3.5  | 1375 | 1310 |
| Example 14 | III | 1060 | 2.5 | 0.24 | 0.44 | 2.2  | 1363 | 1278 |
| Example 15 | IV  | 1040 | 1.8 | 0.30 | 0.60 | 2.5  | 1375 | 1264 |
| Example 16 | V   | 1060 | 1.1 | 0.14 | 0.45 | 4.3  | 1368 | 1260 |
| Example 17 | VI  | 1040 | 1.3 | 0.15 | 0.34 | 2.2  | 1360 | 1268 |

Examples 13 to 17

The magnets of Examples 13 to 17 were prepared to have the same compositions as in Examples 9 to 12 respectively, but the method to add the carbon which was used for formation of the R—Cu-M-C concentrated part was different. In Examples 13 to 17, 0.1 mass % of carbon black was added in the coarsely pulverized powder of the second alloy, and the mixture was mixed in a Nauta mixer and then subjected to a heat treatment in an Ar atmosphere at 600° C. for 1 hour. The subsequent fine pulverization process and the pressing process were the same as in Comparative Example 1. In the sintering process, in order to promote the formation of the R—Cu-M-C concentrated part, the samples were kept at 700° C. for 24 hours during the temperature rising period. After the temperature rising was completed, the samples were kept at a temperature as shown in Table 11 for 4 hours followed by a rapid cooling process. Thereafter, a two-step aging treatment was provided at 850° C. for 1 hour and then at 540° C. for 2 hours (both under an Ar atmosphere). Then, 0.1 mm in each surface of the sintered body was grounded off by a processing machine to provide R-T-B based sintered magnets of 13 mm×8 mm×4 mm. The thickness direction (4 mm in length) was the orientation direction of the c axis of $R_2T_{14}B$ grains.

As shown in Table 11, the existence of the R—Cu-M-C concentrated part and the improvement of the corrosion resistance were both confirmed in Example 1 and also in Examples 9 to 17. Especially in Examples 13 to 17 where the ratio of the R—Cu-M-C concentrated part was high and the (M+Cu)/R value fell within the range of 0.2 to 0.6, the corrosion resistance was shown to be good.

In view of above, it was determined that the R-T-B based sintered magnet from Examples had the R—Cu-M-C concentrated part in the grain boundary. The good magnetic properties were maintained and the corrosion resistance was improved to a large extent.

DESCRIPTION OF REFERENCE NUMERALS 2 a grain (main phase)
4 a two-grain boundary
6 a triple junction
10 an SPM motor
11 a housing
12 a rotor
13 a stator
14 a rotary shaft
15 a rotor core (iron core)
16 a permanent magnet
17 a magnet insertion slot
18 a stator core
19 a throttle
20 a coil

What is claimed is:

1. An R-T-B based sintered magnet comprising $R_2T_{14}B$ grains,
    wherein, R—Cu-M-C concentrated parts exist in grain boundaries formed between or among two or more adjacent $R_2T_{14}B$ grains,
    the concentrations of R, Cu, M and C in the R—Cu-M-C concentrated parts are higher than those in the $R_2T_{14}B$ grains respectively,
    the concentration of C in the R—Cu-M-C concentrated parts is 9 to 20 atomic %,
    R represents at least one rare earth element and M represents at least one selected from the group consisting of Ga, Si, Sn, Ge and Bi,
    a content of R in the R-T-B based sintered magnet is 29.5 mass % or more and 33 mass % or less, and
    in all the R—Cu-M-C concentrated parts, a minimum value of the ratio of the sum of Cu atom and M atom to all of R atoms which is represented as (Cu+M)/R is 0.2 or more and a maximum value of the ratio is 0.6 or less.

2. The R-T-B based sintered magnet of claim 1, wherein, in a cross section of the R-T-B based sintered magnet, the area occupied by the R—Cu-M-C concentrated parts is 1% or more in the grain boundaries.

3. A motor comprising the R-T-B based sintered magnet of claim 2.

4. The R-T-B based sintered magnet of claim 2, wherein M is Ga.

5. A motor comprising the R-T-B based sintered magnet of claim 4.

6. The R-T-B based sintered magnet of claim 2, wherein the area occupied by the R—Cu-M-C concentrated parts is 2% or more in the grain boundaries.

7. The R-T-B based sintered magnet of claim 6, wherein M is Ga.

8. A motor comprising the R-T-B based sintered magnet of claim 7.

9. A motor comprising the R-T-B based sintered magnet of claim 1.

10. The R-T-B based sintered magnet of claim 1, wherein M is Ga.

11. A motor comprising the R-T-B based sintered magnet of claim 10.

12. The R-T-B based sintered magnet of claim 1, wherein a weight loss after saturation PCT (Pressure Cooker Test) for 200 hours in an atmosphere of saturated water vapor with 100% relative humidity and 2 atm at 120° C. is 0.3 mg/cm$^2$ or more and 0.9 mg/cm$^2$ or less.

13. A motor comprising the R-T-B based sintered magnet of claim 12.

* * * * *